United States Patent [19]

Isobe

[11] 4,227,213
[45] Oct. 7, 1980

[54] VIDEO SIGNAL RECORDING SYSTEM
[75] Inventor: Teruhiko Isobe, Tokyo, Japan
[73] Assignee: Pioneer Electronic Corporation, Tokyo, Japan
[21] Appl. No.: 961,172
[22] Filed: Nov. 16, 1978
[30] Foreign Application Priority Data
Nov. 16, 1977 [JP] Japan .............................. 52-137630
[51] Int. Cl.$^2$ ............................................. H04N 5/76
[52] U.S. Cl. .................................. 358/128.5; 360/19
[58] Field of Search ....................... 360/19; 358/128; 179/100.3 V

[56] References Cited
U.S. PATENT DOCUMENTS

| | | | |
|---|---|---|---|
| 3,363,054 | 1/1968 | Mason | 179/100.3 V |
| 3,909,512 | 9/1975 | Omori et al. | 360/19 |
| 3,924,062 | 12/1975 | Broadbent | 360/19 |
| 4,065,795 | 12/1977 | Shutterly | 360/19 |

*Primary Examiner*—Stuart N. Hecker
*Attorney, Agent, or Firm*—Sughrue, Rothwell, Mion, Zinn and Macpeak

[57] ABSTRACT

A system for recording stationary images on a convolution track of a video disk in which a stationary image video signal of at least one frame is optically recorded on the track every revolution of the disk. An audio signal is recorded on portions of the track corresponding to every predetermined number of lines of the video signal. The audio signals are time compressed and are recorded on respective portions of the track corresponding to a predetermined number of lines of the video signal. During the read-out, the audio signals are time expanded. The video signal is reproduced from the video signals recorded in lines immediately preceding the audio signals. In another embodiment the video signal is reproduced with the mean of the video signals immediately preceding and subsequent to lines where the audio signals are recorded.

13 Claims, 4 Drawing Figures

VIDEO SIGNAL RECORDING SYSTEM

BACKGROUND OF THE INVENTION

The present invention relates to a video signal recording and reproducing system for performing the same and, in particular, to a method and an apparatus for recording, on a video disk, both of an audio signal and a video signal corresponding to a stationary picture and reproducing the signals simultaneously.

An optical video disk is provided with a number of fine pits corresponding to information included in the video signal on and along a convolutional track on the disk. When the reproduction of signals is desired, the disk is rotated at a predetermined rotational speed and the track thereon is illuminated with a spot light. Reflected light from the track is received by a photo-electric conversion element and the intensity variation of the reflected light is converted into an electric signal to readout the video signal. Various control signals such as horizontal and vertical synchronizing signals, included in the video signal are then separated to reproduce the video signal.

It is well known that when such a video disk as above is used reproduction of a stationary picture becomes very easy and the number of stationary pictures recordable on the video disk of normal size is in the order of 50,000 for each disk plane. For reproduction of each stationary picture, it is sometimes necessary to take 15 to 30 seconds for expanding the picture. However, there has been no satisfactory system proposed for this purpose.

The video signal is generally recorded along convolution tracks on an optical video disk so that one TV frame is recorded for each revolution of the disk. That is, the video disk is rotated in synchronism with a frame frequency (about 30 Hz) of a TV image signal to be recorded and, at the same time, is shifted radially by about 2 $\mu$m for each revolution. A beam of light such as laser beam shaped by a condenser lens to have a diameter in cross-section of about 1 $\mu$m is directed on to the information recording plane of the video disk covered by the photo-resist. The intensity of the light beam is modulated with a carrier wave that is frequency-modulated with a TV image signal to be recorded. Therefore on the recorded disk, the repetition rate and length of the pits represent the frequency-modulated carrier wave and are arranged along convolution loci whose pitch is about 2 $\mu$m. One TV frame (i.e., one picture) is recorded on one turn track and starting points of the frames (i.e., vertical synchronizing signals of either odd numbered or even numbered TV frames) are set on a common radial line on the disk.

The reproduction is performed by illuminating the information containing plane of the disk with a laser beam having diameter in cross-section of about 1 $\mu$m and having an intensity much lower than that in recording while rotating the disk at a constant rotation speed of about 30 rps (i.e., TV frame frequency) as in the recording process. Light reflected from the plane or passed through the disk whose intensity is modulated by the pits on a light receiving and a converting device is employed to obtain an electric signal. The remaining steps are demodulating the electric signal with a demodulator and displaying the modulated signal on a face plate of a CRT as the TV image signal.

In order to trace the pits loci on the disk with the readout laser beam precisely, a movable reflection mirror for deflecting the beam in the radial direction of the disk at a high speed and a servo-motor for shifting a whole readout device in the radial direction of the disk at a substantially constant pitch of about 2 $\mu$m are provided. These components are controlled by a control signal to be obtained from the readout light spot. Also, a focus servo loop may be used for shifting a condenser lens for the laser beam to precisely focus the beam on the information containing plane of the disk.

In order to obtain a stationary picture, the operation of the servo-motor is terminated to stop the shifting of the entire readout device and a specific circular locus on the disk corresponding to the picture is illuminated repeatedly with the beam by means of the movable reflection mirror. That is, since the starting points of the recordings of frames are on the common radial line of the disk, it is sufficient to swingingly return the beam from the movable reflection mirror at a high speed by the track pitch of about 2 $\mu$m when a preceding readout of one frame is completed. Furthermore, since the returning period of the beam is within the so-called vertical blanking period, there is no problem with the display. By repeating the above process, one stationary picture can be reproduced on the CRT screen.

A subsequent stationary picture can be performed by omitting the last beam returning process. The average position of the movable reflection mirror may deviate after a number of consecutive statonary pictures are reproduced in this manner. In such a case, it may be advisable to shift intermittently the entire readout device by the servo-motor by a radial distance corresponding to the deviation.

In this manner, it is easy to obtain stationary pictures by using the optical video disk.

In general, however, it is highly desirable to have an audio explanation of a stationary picture on the CRT screen and it is advisable to realize this effect by the use of a common video disk.

SUMMARY OF THE INVENTION

An object of the present invention is to provide a system for recording stationary image signals and audio signals.

It is another object of this invention to provide apparatus for recording a stationary image signals and an audio signal on a common video disk.

Yet another object of this invention is to provide for a method of recording audio signals on a video disk track at a predetermined interval.

These and other objects of this invention are accomplished by a novel system where an audio signal is recorded on portions of a track on a video disk corresponding to a predetermined number of lines of the video signal.

The frequency band for a TV image signal recordable on a video disk is form d.c. to about 4 MHz and is about 260 times that of the audio signal which may be about 15 KHz. Therefore, it is possible to record the audio signal of about 8.5 seconds in length within one frame (i.e., about 1/30 second) of the TV image signal when the audio signal is compressed in the time axis. Stated differently, it is possible to record an audio signal of about 16 m-seconds within one line (i.e., about 63.5 $\mu$ seconds) of the image signal. In the case of a stationary picture, it is not always necessary to provide the frequency band of the audio signal as wide as 15 KHz and it may be a fraction of the band. Assuming a situation where the audio signal has a band width of about 5 KHz, it may be possible to record the audio signal of about 50 m-seconds within one line period of the image signal. Therefore, it is possible to record the audio signal of about 50 m-seconds in one line period of the image signal, to record a next audio signal of about 50 m-seconds in one line after 50 m-seconds (50 ms/63.5 μs=788 lines) subsequent to the first audio signal recording and to sequentially repeat this procedure.

Assuming that an audio information signal of about 25 seconds long is recorded in this manner, about 500 lines are required for the audio signal corresponding thereto. This means that the audio signal occupies about one frame (525 lines) of the TV image signal. Therefore, since the image signal for a stationary picture is recorded within a time period corresponding to one frame, it is sufficient to have two frames for simultaneous recordings of the image signal and the audio signal.

In this case, although the audio signal recorded in one line period is time-compressed to 1(H)/788(H), about 80% of the one line can be available for the audio signal because a horizontal synchronizing signal, color subcarrier signal and system control signals etc. are included in the one line. Therefore, the audio signal can be considered as being time-compressed to about 1/1000 (0.8/788).

In reproducing the information recorded in this manner, the audio signal in the first one line, which is time-compressed to about 1/1000, is expanded by about 1000 times by, for example, a time-axis expansion converter having memory function to reproduce the audio signal of 50 m-seconds (788 lines). The next audio signal in the second one line after 788 lines subsequent to the first one line is similarly expanded, and so on, resulting in audio information reproduction. The image signal is usually reproduced line by line during the line period therefore except that the content of the line just preceding the line in which the compressed audio signal is recorded, is reproduced with one line delay.

In another aspect of the present invention, an average signal of the image signals recorded in lines adjacent to one line in which the audio signal is recorded is reproduced.

As mentioned above, one stationary picture and an audio explanation thereof for about 30 seconds are simultaneously obtained by repreatedly reproducing a track on the video disk the length of which corresponds to 2 TV frames.

This invention will be more fully explained by reference to the accompanying drawings and the description of the preferred embodiment that follows.

DESCRIPTION OF THE PREFERRED EMBODIMENTS

Figure 1:
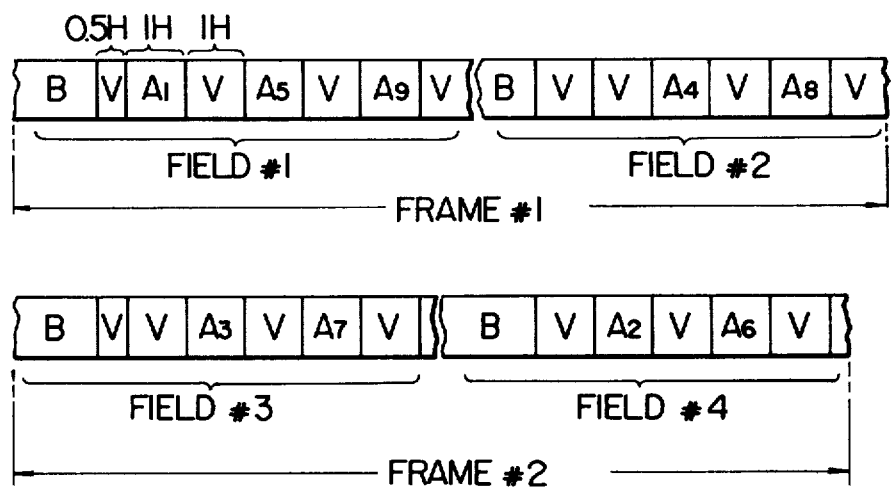
FIG. 1 is a composite signal construction for explaining the recording system according to the present invention.

Referring now to FIG. 1, an example of a composite information signal pattern composed of two frames containing one stationary image information and an audio information is shown. In this pattern B is a blanking period, V is a video signal, Ai is an audio signal and H is a line. In a first field, in one line, immediately after a video signal (V) of 0.5 H subsequent to a blanking period B, a first audio signal A, the width of which is about 50 m-seconds is recorded with time-axis compression. A second audio signal $A_2$ is compressed and recorded in one line after 788 lines subsequent to the line in which the first signal $A_1$ is recorded, i.e., in a second line from a blanking period B in a fourth field.

A third audio signal $A_3$ of 50 m-seconds is compressed and recorded in a line after 788 lines subsequent to the line in which the second audio signal $A_2$ is recorded, i.e., in a line after 1.5 lines from the blanking period B in a third field of the second frame. By repeating the above, signal components $A_4$ to $A_9$ and $A_{510}$ (not shown) and the image signal components are alternatively recorded, resulting in a recording of an audio information signal of 25.5 seconds (50 m-seconds×510 lines) long in total within 2 frames.

Figure 2:
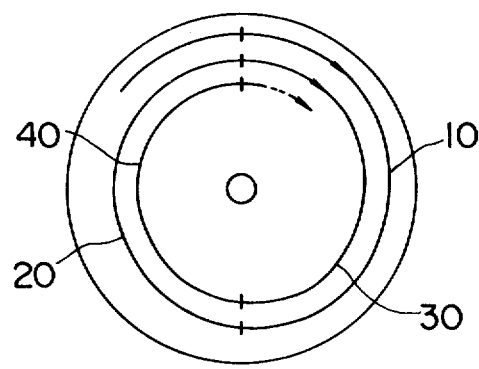
FIG. 2 is a plane view of a video disk showing an arrangement of convolution tracks.

FIG. 2 shows a relation of the fields and frames in FIG. 1 and the recording tracks on the video disk. As shown in FIG. 2, semicircular track portions 10 to 40 correspond to the first to fourth fields in FIG. 1, respectively, which constitute a single stationary picture signal.

Figure 3:
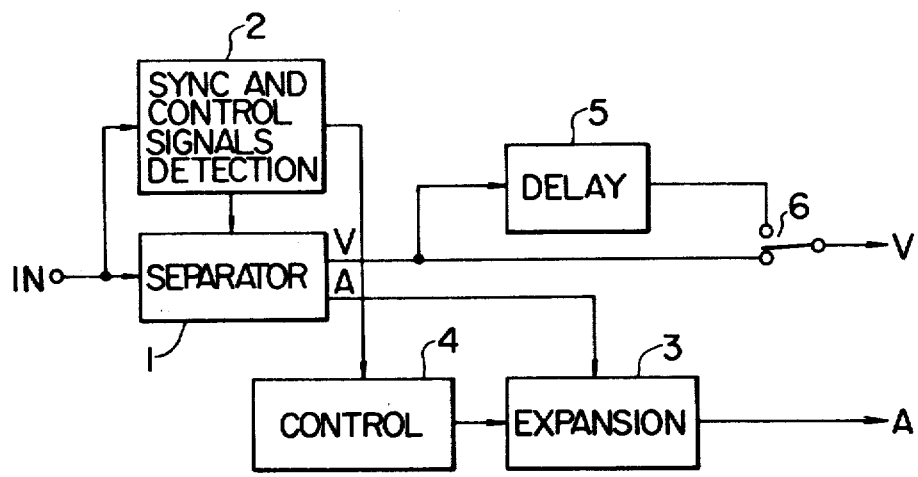
FIG. 3 is a preferred embodiment of the reproducing device according to the present invention.

FIG. 3 is a block diagram showing an embodiment of the reproducing device of the present invention. A readout means (not shown) is provided to receive light reflected from the track in FIG. 2, which is obtained by directing a spot light to the track while rotating the disk in FIG. 2 at a constant rotation speed, in this example, at 30 revolutions/sec. The reflected light is converted into an electric signal containing a variation of the intensity of the reflected light. The electric signal is supplied through an input terminal IN to a video-audio separator circuit 1 and a detection circuit 2 for detecting the synchronization signals and the control signals. The audio signal components $A_1$ to $A_{510}$ separated from the video signal by the separation circuit 1 are supplied to a time-axis expansion circuit 3.

The first audio signal component $A_1$ has a control signal portion (not shown in FIG. 1) at the leading end thereof. The control signal portion is detected by the detection circuit 2 and supplied to a control circuit 4. In response to the control signal, the control circuit 4 provides a write-in instruction signal which is supplied to the time-axis expansion circuit 3 to cause the audio signal component $A_1$ supplied thereto from the separation circuit 1 to be written therein. The control circuit 4 causes the component $A_1$ to be expanded in time by about 1000 times so that the component $A_1$ has a real time of 50 m-seconds. The expanded component is a real audio signal component A.

The audio signal components within the above 788 lines period (50 m-seconds) between the first and second components $A_1$ and $A_2$ are controlled by the control circuit 4 so that they are inhibited to be written in the time-axis expansion circuit 3. After the 788 lines period has passed, the second component $A_2$ is allowed to be written in the expansion circuit 3. By repeatedly reproducing the two frames 10 to 40 (FIG. 2) in this manner, a continuous audio signal of about 25 seconds can be reproduced.

Concerning the reproduction of the video signal, the video output V of the separation circuit 1 is supplied to a one line delay circuit 5. An output of the delay circuit 5 is connected to one of two contacts of a single pole, double throw switch 6. The video output of the separator circuit V is also connected to the other contact of the switch 6. The separation of the switch 6 is controlled by a system control signal (not shown in FIG. 1) detected by the detection circuit 2 so that, in the line period in which the audio signal is recorded, the output of the delay circuit 5, which is the video signal in one line just preceding the period, appears as the output signal. In the line period in which the video signal is recorded, the video output of the separator 1 is transmitted as is. Therefore, by reproducing the two frames 10 to 40 (FIG. 2) sequentially repeatedly, the stationary picture is reproduced simultaneously with the audio information.

Figure 4:
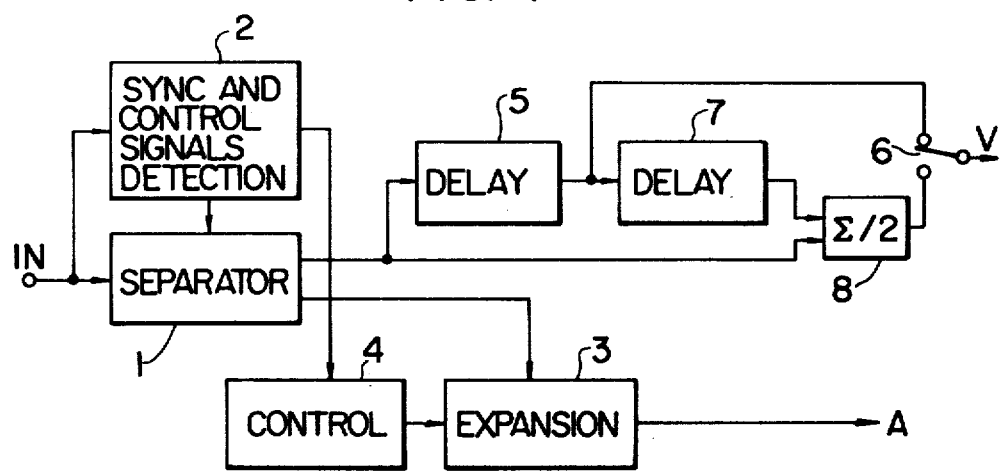
FIG. 4 is another preferred embodiment of the present reproducing device.

FIG. 4 is a block diagram of a second embodiment of the present invention in which the same circuit components as those in FIG. 3 are depicted by the same reference numerals. In FIG. 4, the reproduction of the audio signal is performed in the same manner as that in FIG. 3 and therefore the description thereof may be unnecessary.

However the reproduction of the video signal is different. The output of the separation circuit 1 is supplied to the input of the one line delay circuit 5 and its output is connected to the one contact of the switch 6. The output of the delay circuit 5 is also supplied to an input of another one line delay circuit 7. An output of the delay circuit 7 is connected to one input of a mean circuit 8 and it is connected to the other contact of the switch 6. The mean circuit is a summation and division circuit to provide an average value output.

The other input of the mean circuit 8 is the output of the video-audio separation circuit 1, so that the output signals of the separator 1 and that delayed by two lines are averaged. The switch 6 is controlled by the system control signal as in the embodiment in FIG. 3.

With the circuit arrangement in FIG. 4, when a video signal is available from the separator circuit 1, it is delayed by one line in the delay circuit 5 and appears at the output of the switch circuit 6 as the reproduction signal. On the other hand, when the video reproduction signal is not available at the output of the delay circuit 5, i.e., during the time frame when the audio signal is available at the output of the separator 1 which corresponds to one line period in which the audio signal is recorded, the output of the mean circuit 8 appears at the switch circuit 6 as the reproduction signal. Therefore, in this time period, a signal which is a mean signal of the video signals recorded in preceeding and following lines with respect to the audio line is reproduced as the video reproduction signal. Thus, by repeatingly reproducing the two frames sequentially as in the manner described with reference to the embodiment in FIG. 3, one stationary image can be reproduced together with the audio information.

The time-axis expansion circuit 3 in the respective embodiments mentioned above, may be a CCD or BBD memory device, a digital memory device or a magnetic memory device.

It is obvious that it is easy to provide an audio signal of desired time length for one stationary image according to the memory capacity of the time-axis expansion circuit and the band width of the audio signal. Therefore, the examples mentioned with reference to the specific embodiments do not constitute or define any limitations of the present invention. It should be noted that the basic concept of the present invention is that a first audio signal portion of a predetermined time length is time-axis compressed and recorded in one line period of a video signal and then a second portion of the signal of the predetermined time length is compressed and recorded in one line period of the video signal immediately after the predetermined time length, and so on.

As clear from the foregoing description, according to the present invention, it becomes possible to record the stationary image and audio information concerned therewith simultaneously on a common video disk, the number of the stationary images with the audio informations recordable in one video disk being in the order of 25,000. Further, according to the present invention, the real time length of the audio information for one stationary image can be arbitrarily selected. Alternatively, it is possible to compress or expand the reproduction time of the stationary image according to the length of the audio information.

The present invention can be effectively applied to a video filing device, video encyclopedia, the video catalog and audiovisual education apparatus.

Other modifications of this invention will be apparent from this description without departing from the essential scope of the invention.

What is claimed is:

1. In a method of recording stationary video images on a convolution video track of a video disk, in which a stationary image video signal of at least one frame is optically recorded on said convolution video track every revolution of the disk, an improvement comprising the step of recording an audio signal on portions of the same said convolution video track, said portions corresponding to a predetermined number of lines of said video signal.

2. A recording method as claimed in claim 1, wherein said stationary image video signal is recorded on portions of the track corresponding to two frames of the video signal.

3. A recording method as claimed in claim 1 or 2, wherein the audio signal is time-axis compressed and recorded.

4. In a method for optically recording stationary image video signals each at least one frame on a video track of a video disk and optically reproducing the video signals from said video track with one stationary image video signal every revolution of the disk, the improvement comprising the steps of:
  time-axis compressing audio signals each having a predetermined real time,
  recording said compressed audio signals on respective portions of the same said video track, said portions corresponding to a predetermined number of lines of said video signal,
  reading out the audio signals repeatedly and reproducing the read-out audio signals while expanding the time axis thereof,
  reproducing the video signal with the video signals recorded in lines immediately preceding lines of the audio signals recordation and substituting said preceding video lines for said lines bearing said audio signals.

5. In a method for optically recording stationary image video signals each at least one frame on a video track of a video disk and optically reproducing said video signals from said video track with one stationary image video signal every revolution of the disk, the improvement comprising the steps of;

time-axis compressing audio signals each having a predetermined real time, recording said compressed audio signals on respective portions of the same said video track corresponding to a predetermined number of lines of the video signal, reproducing said video signals with a mean video signal of the video signals recorded in lines immediately preceding and subsequent to lines where the audio signals are recorded and being used as the video signals recorded in the audio signal bearing lines.

6. A method as claimed in claim 4 or 5, wherein a stationary image video signal is recorded in portions of the track corresponding to two frames of the video signal.

7. A video signal reading and reproducing apparatus comprising; means for reading out signals recorded on a recording plane of a video disk while the video disk rotates at a predetermined rotation rate; reproduction means for reproducing a readout signal, said reproduction means including separation means for separating a video signal and an audio signal contained in an output of said readout means; time-axis conversion means for converting the time-axis of the audio signal output of said separation circuit, and means for delaying the video signal output of said separation circuit by a time interval substantially equal to the time period of the audio signal recorded so that the output of said delay means is reproduced as the video signal output during the time interval within which the audio signal is recorded.

8. A video signal reading and reproducing apparatus of claim 7, wherein the time interval within which the audio signal is recorded corresponds substantially to one line period of the video signal.

9. A video signal readout and reproduction apparatus comprising; video signal reading and reproducing apparatus including, means for reading out signals recorded on a recording plane of a video disk while the video disk rotates at a predetermined rotation rate; reproducing means for reproducing a readout signal, said reproduction means including separation means for separating a video signal and an audio signal contained in an output of said readout means, time-axis conversion means for converting the time-axis of the audio signal output of said separation circuit, first delay means for delaying the video signal output of said separation circuit by a first time period substantially equal to the time period of the audio signal recorded, second delay means for delaying an output of said first delay means by the first time period; and means for averaging an output of said second delay means and the output of said separation circuit, wherein the output of said averaging means is reproduced as the video signal generated in the time interval when the audio signal is recorded.

10. A video signal readout and reproduction apparatus as claimed in claim 9, wherein the time interval when the audio signal is recorded corresponds substantially to one line period of the video signal.

11. A method for storing video and audio signals on a video disk comprising the steps of
   (a) recording a frame of video information along a track of said video disk at a first set of preselected track locations;
   (b) recording at least first and second sequential compressed audio signals along the same said track of said video disk at a second set of preselected track locations;
   (c) said compressed audio signals being designed for time expansion to produce an audio program, said time expansion being in accordance with a preselected expansion factor equal to the ratio of (i) time period for processing said expanded audio signals, and (ii) the time period for processing said compressed audio signals;
   (d) said first compressed audio signal being separated along said track from said second sequential audio signal by a distance determined in accordance with said expansion factor.

12. The method of claim 11, wherein said time period for processing said compressed audio signals is substantially equal to the time of one horizontal video line scan.

13. The method of claim 11, wherein said second set of preselected track locations contain said at least first and second sequential audio signals followed by an additional plurality of sequential audio signals, said first, second and plurality of audio signals separated along said track by said distance determined in accordance with said expansion factor, whereby said first and second sets of preselected track locations are disposed in an interleaved relationship.

* * * * *